United States Patent
Corcoran et al.

(10) Patent No.: US 6,218,935 B1
(45) Date of Patent: *Apr. 17, 2001

(54) METHOD AND APPARATUS FOR CONTROLLING THE INFLATION PRESSURE OF PNEUMATIC WHEELS

(75) Inventors: Paul T. Corcoran, Washington; Everett G. Brandt, Brimfield, both of IL (US)

(73) Assignee: Caterpillar, Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,562

(22) Filed: Feb. 25, 1999

(51) Int. Cl.[7] .................................................. B60C 23/00
(52) U.S. Cl. .......................... 340/444; 340/441; 340/442; 73/146.2
(58) Field of Search ..................... 340/438, 441, 340/442, 444; 73/146.2, 49

(56) References Cited

U.S. PATENT DOCUMENTS

| 4,744,399 | * | 5/1988 | Magnuson et al. ................. 152/417 |
| 5,179,981 | | 1/1993 | Hicks et al. ........................ 141/4 |
| 5,180,456 | | 1/1993 | Schultz et al. .................... 152/416 |
| 5,327,346 | | 7/1994 | Goodell ......................... 364/426.02 |
| 5,569,848 | | 10/1996 | Sharp .............................. 73/146.2 |
| 5,587,698 | * | 12/1996 | Genna ............................... 340/442 |
| 5,629,874 | | 5/1997 | Mittal .............................. 364/558 |
| 5,736,939 | | 4/1998 | Corcoran ......................... 340/905 |

* cited by examiner

*Primary Examiner*—Daryl Pope
(74) *Attorney, Agent, or Firm*—Howard & Howard

(57) ABSTRACT

A method and apparatus for controlling inflation pressure of at least one pneumatic wheel on a machine is disclosed. This includes determining a ground speed or ground acceleration of the machine and determining a rotational velocity or rotational acceleration of a drivetrain for the machine as well as adjusting the inflation pressure in response to a relationship between the ground speed of the machine and the rotational velocity of the drivetrain for the machine or the ground acceleration of the machine and rotational acceleration of the drivetrain for the machine. The temperature of and weight load applied to pneumatic wheel can also be utilized in altering the inflation pressure of the pneumatic wheel. This data may be stored and inflation pressure of at least one pneumatic wheel may be controlled based on this previously stored data.

28 Claims, 5 Drawing Sheets

Fig_1_
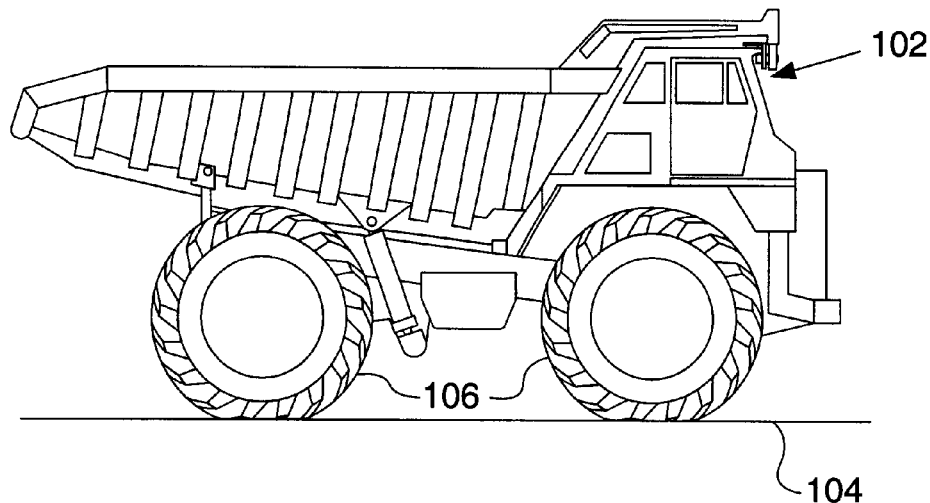
Fig_2_
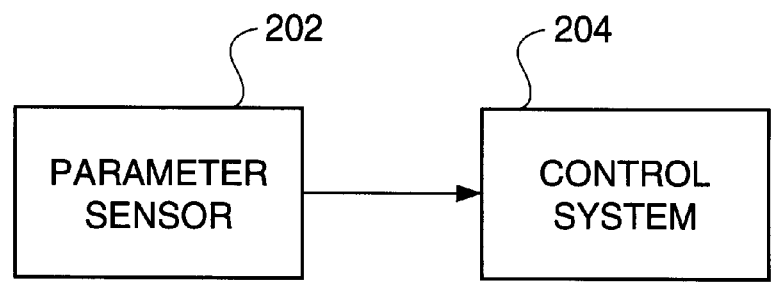

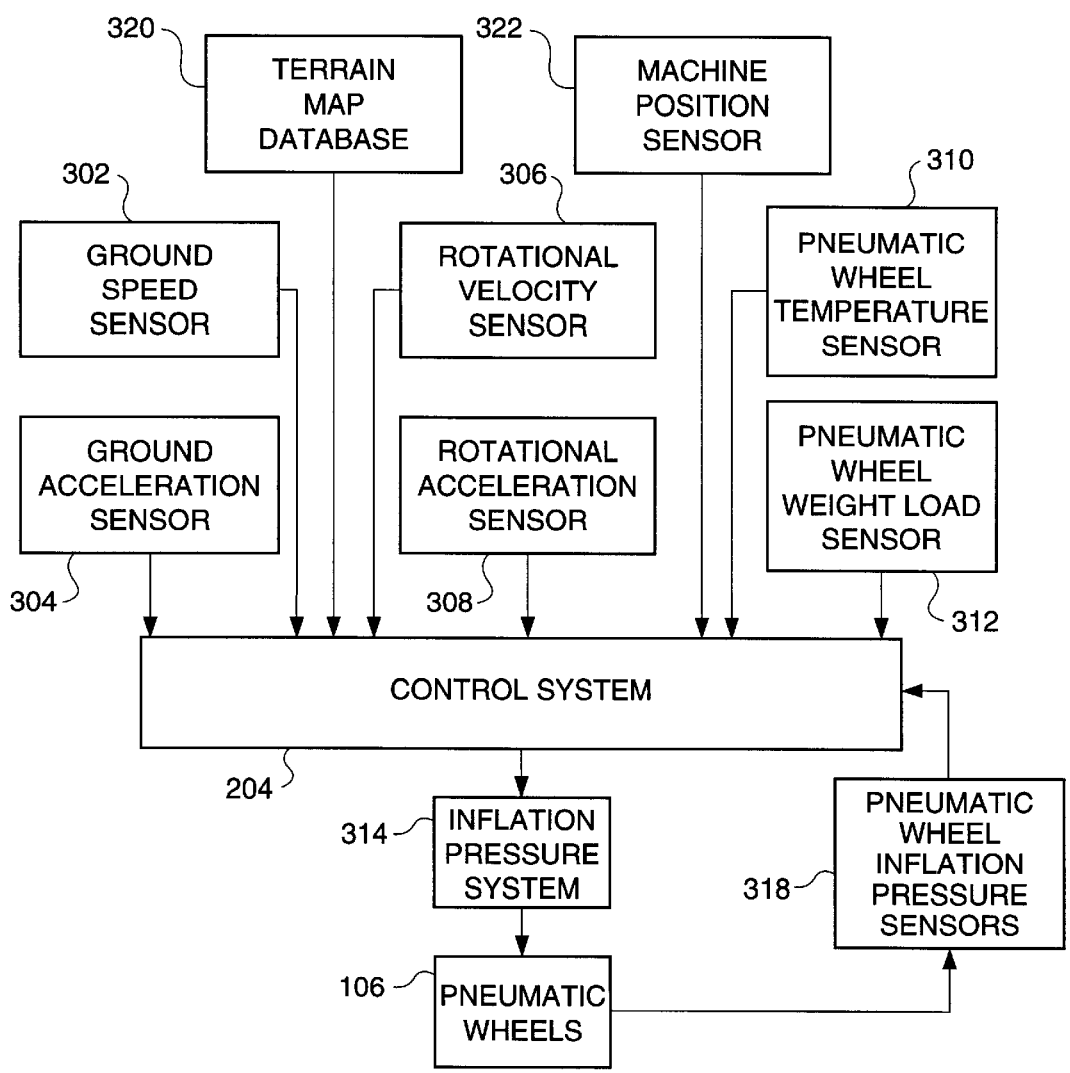

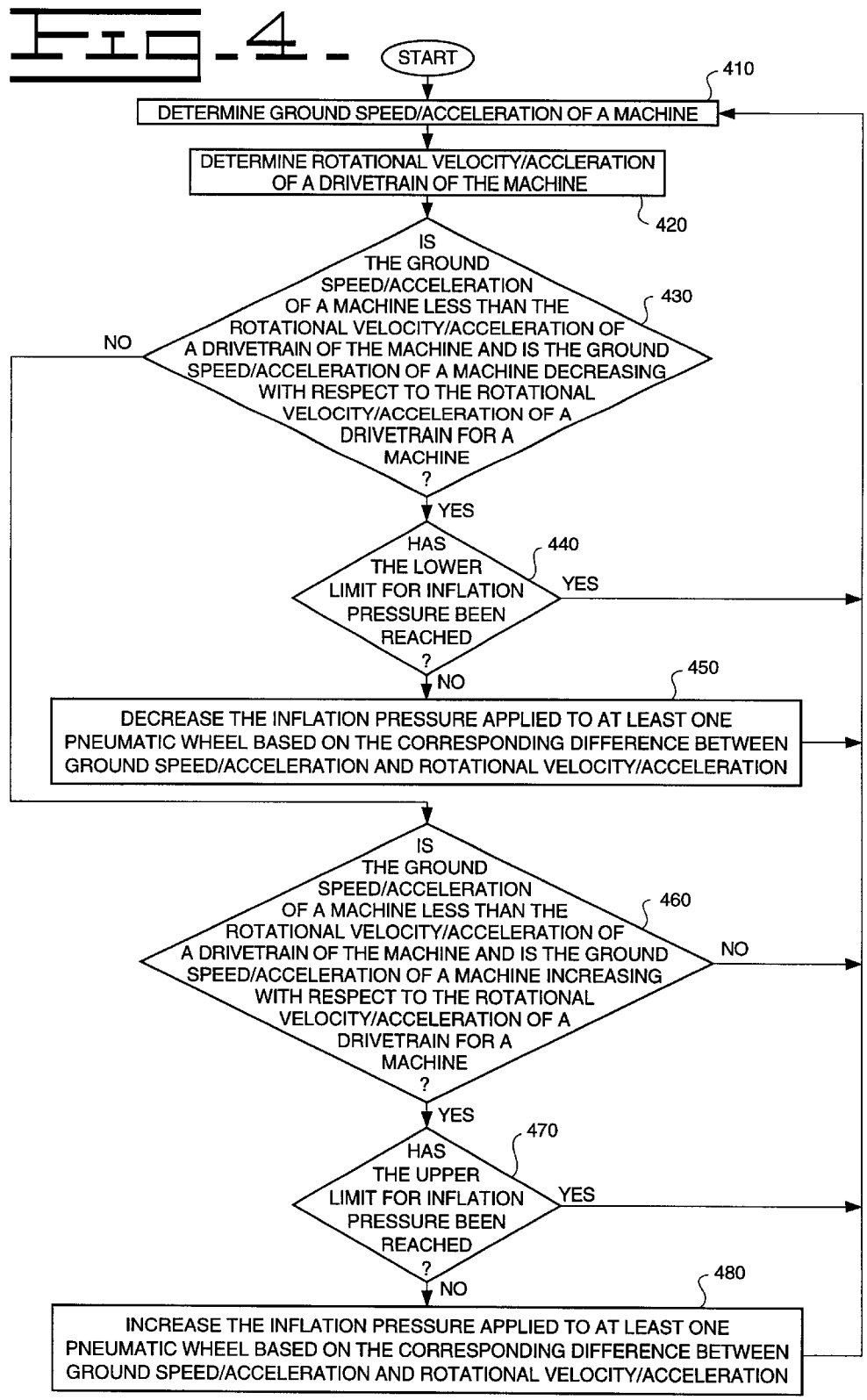

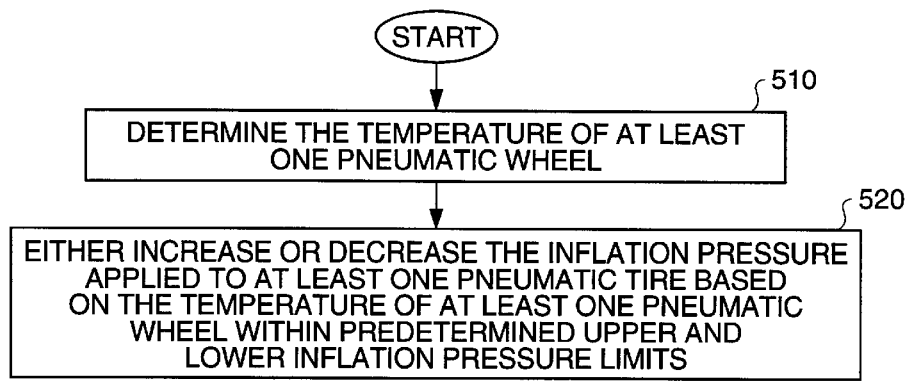
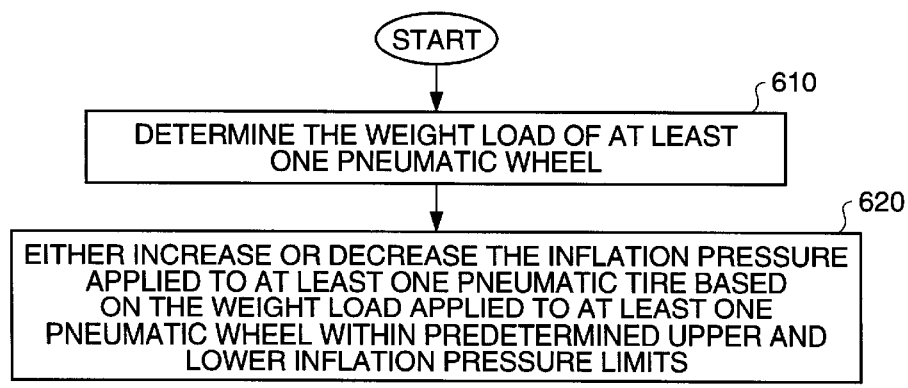

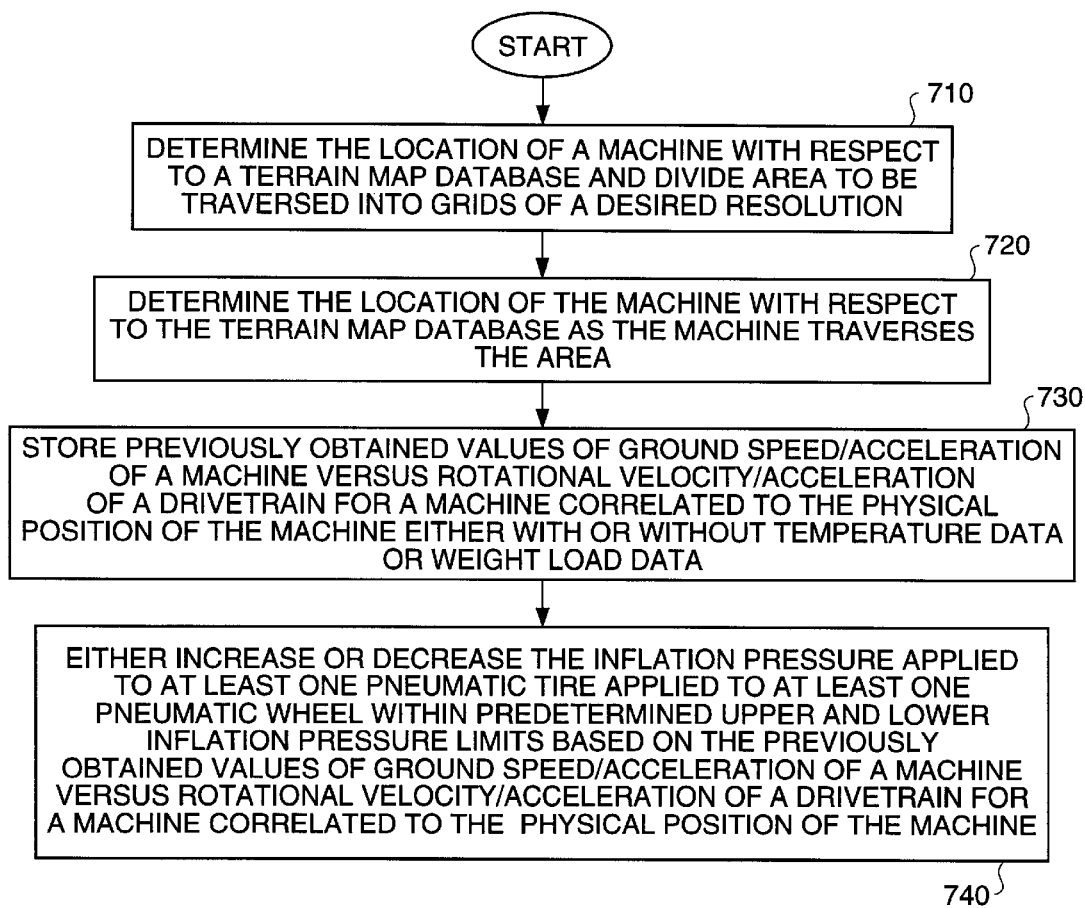

METHOD AND APPARATUS FOR CONTROLLING THE INFLATION PRESSURE OF PNEUMATIC WHEELS

TECHNICAL FIELD

This invention relates generally to a method and apparatus for controlling the inflation pressure of pneumatic wheels for a machine and, more particularly, to a method and apparatus for varying the inflation pressure of pneumatic wheels as a function of either ground speed in relation to the rotational velocity of a drivetrain for the machine or as a function of ground acceleration of a machine in relation to the rotational acceleration of a drivetrain for the machine.

BACKGROUND ART

The mobility of machines, especially in an off-road environment, is highly dependent on the contact pressure between the pneumatic wheels of the machine and the surface of the ground. When the surface of the ground is hard, the pneumatic wheels preferably have high contact pressures with relatively small contact areas. The high inflation pressure in the pneumatic wheels results in greater mobility of the machine with less energy and more efficiency. In contrast, when the surface of the ground is soft, the pneumatic wheels preferably have low contact pressures with relatively large contact areas. The result of this is that when the inflation pressure of the pneumatic wheels is too high and the contact pressure is too small, sinkage into the ground, or at the very least, a loss of traction between the pneumatic wheels and the ground can occur.

A change in the inflation pressure in the pneumatic wheels of a machine could increase and decrease both ground contact pressure as well as ground contact area depending on the conditions of the ground. It would be very difficult for the operator to constantly alter the level of inflation pressure in the pneumatic wheels. This would be very distracting and require either a constant examination of the ground or a thorough knowledge of the conditions of the ground. Therefore, it would be advantageous to optimize the efficient operation of the pneumatic wheels on a machine by varying the inflation pressure of the pneumatic wheels.

The present invention is directed to overcoming one or more of the problems as set forth above.

DISCLOSURE OF THE INVENTION

In one aspect of the present invention, a method for controlling inflation pressure of at least one pneumatic wheel on a machine is disclosed. The method includes the steps of determining a ground speed or ground acceleration of the machine and determining a rotational velocity or rotational acceleration of a drivetrain for the machine as well as adjusting the inflation pressure in response to a relationship between the ground speed of the machine and the rotational velocity of the drivetrain for the machine or the ground acceleration for the machine and rotational acceleration of the drivetrain for the machine.

In another aspect of the present invention, an apparatus for controlling inflation pressure of at least one pneumatic wheel on a machine is disclosed. This apparatus includes a mechanism for determining a ground speed or ground acceleration of the machine and determining a rotational velocity or rotational acceleration of a drivetrain for the machine as well as adjusting the inflation pressure in response to a relationship between the ground speed of the machine and the rotational velocity of the drivetrain for the machine or the ground acceleration of the machine and rotational acceleration of the drivetrain for the machine.

BRIEF DESCRIPTION OF THE DRAWINGS

FIG. 1 is a diagrammatic illustration of a machine, e.g., load hauling machine, suitable for use with the present invention;

FIG. 2 is a block diagram illustrating a relationship between a control system and a parameter sensor associated with the present invention;

FIG. 3 is a is a block diagram further illustrating the embodiment of FIG. 2;

FIG. 4 is a flow diagram illustrating a method for controlling the inflation pressure of pneumatic wheels of the present invention;

FIG. 5 is a flow diagram illustrating an optional aspect of the present invention for measuring pneumatic wheel temperature;

FIG. 6 is a flow diagram illustrating an optional aspect of the present invention for measuring weight load applied to pneumatic wheels; and FIG. 7 is a flow diagram illustrating an alternative embodiment of the present invention utilizing a relationship between either ground speed of a machine and rotational velocity of a drivetrain for a machine or ground acceleration of a machine and rotational acceleration of a drivetrain for a machine correlated to physical locations in a terrain map database.

BEST MODE FOR CARRYING OUT THE INVENTION

Referring to the drawings, and initially to FIG. 1, a method and apparatus for controlling the inflation pressure of pneumatic wheels of a machine is disclosed. An illustrative, but nonlimiting example of a machine 102, is a load-hauling machine, as is shown with a plurality of pneumatic wheels 106 in contact with the ground 104. An illustrative, but nonlimiting, example of pneumatic wheels 106 includes tires. Although a load-hauling machine 102 is disclosed, virtually any type of machine that moves through the rotation of pneumatic wheels 106 may utilize this present invention.

Referring now to FIG. 2, at least one parameter sensor 202 is utilized with the machine 102. This parameter sensor 202 functions to sense a parameter of the machine 102 and deliver a responsive signal to a control system 204 that is connected to the machine 102.

Referring now to FIG. 3, a more detailed diagram of FIG. 2 is shown. There is at least one pneumatic wheel inflation pressure sensor 318 that senses the actual inflation pressure of at least one of the pneumatic wheels 106, and delivers the actual inflation pressure measurement to the control system 204. The control system 204 compares the actual inflation pressure with the desired inflation pressure for direct control of an inflation pressure system 314 that raises and lowers the inflation pressure applied to the pneumatic wheels 106.

The first embodiment of the present invention utilizes a ground speed sensor 302 in conjunction with a rotational velocity sensor 306. The ground speed is the actual velocity in which the machine 102 traverses the ground, while the rotational velocity measures the rotational speed of the drivetrain or other internal rotating components of the machine 102 such as the engine. The ground speed sensor 302 could be any one of numerous global positioning systems (GPS) known in the art. The ground speed sensor 302 could also include non-contacting ultrasonic or radar-type sensors. The rotational velocity sensor 306 is preferably a conventional electrical transducer. A typical, but nonlimiting example of a conventional electrical transducer would be a magnetic speed pickup. However, numerous other types and methods of speed sensing may be utilized.

The second and preferred embodiment of the present invention utilizes a ground acceleration sensor 304 in conjunction with a rotational acceleration sensor 308. The ground acceleration sensor 304 could preferably be an accelerometer. However, a first derivative of ground speed calculated by any of wide variety of electronic controllers/computers that embody the control system 204 will suffice. As previously described, ground speed could be ascertained by any one of numerous global positioning systems (GPS) known in the art or could also include a non-contacting ultrasonic or radar-type sensor. A rotational acceleration sensor 308 is preferably the first derivative of rotational velocity calculated by any of wide variety of electronic controllers/computers that embody the control system 204. As previously described, rotational velocity could be ascertained by a rotational velocity sensor that preferably includes a conventional electrical transducer. A typical, but nonlimiting example of a conventional electrical transducer would be a magnetic speed pickup. However, numerous other types and methods of velocity sensing may be utilized. Although not preferred, an accelerometer may also be utilized.

The software for controlling the inflation pressure of pneumatic wheels 106 will now be discussed with reference to FIG. 4, which depicts a flowchart representative of the computer program instructions executed by the control system 204, as shown in FIG. 3. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. As shown in FIG. 4, the program first determines either the ground speed or the ground acceleration of the machine 102 as previously described above <410>. The software program then determines either the rotational velocity or rotational acceleration of a drivetrain for the machine 102 that is also previously described above <420>. Then, depending on the embodiment, the ground speed of the machine 102 will be compared to the rotational velocity of the drivetrain for the machine 102 and a determination will be made as to whether or not the ground speed of the machine 102 is less than the rotational velocity of the drivetrain for the machine 102 and if the ground speed of the machine 102 is decreasing with respect to the rotational velocity of the drivetrain for the machine 102 <430>. This creates what is defined as ground speed versus rotational velocity differential data. For the second and preferred embodiment of the present invention, the same step occurs only with acceleration rather than velocity so that the ground acceleration of the machine 102 will be compared to the rotational acceleration of the drivetrain for the machine 102 and a determination will be made as to whether or not the ground acceleration of the machine 102 is less than the rotational acceleration of the drivetrain for the machine 102 and if the ground acceleration of the machine 102 is decreasing with respect to the rotational acceleration of the drivetrain for the machine 102 <430>. This creates what is defined as ground acceleration versus rotational acceleration differential data. If the response to the query posed in software program step <430> is positive, then a determination is made as to whether or not the lower inflation pressure limit for the pneumatic wheels 106 has been reached <440>. If this lower inflation pressure limit has not been reached, then the control system 204 through the inflation pressure system 314 will decrease the inflation pressure applied to the pneumatic wheels 106 as measured by the pneumatic wheel inflation pressure sensors 318, as shown in FIG. 3 <450>. This decrease is preferably proportional to either the velocity difference or the acceleration difference depending on the embodiment, however, the decrease may be incremental. After decreasing the inflation pressure in the pneumatic wheels 106, the software program will return to program step <410> to start this cycle all over again. If this lower inflation pressure limit has been reached in program step <440>, then the control system 204 through the inflation pressure system 314 will not decrease the inflation pressure applied to the pneumatic wheels 106 and the software program will return to program step <410> to start this cycle all over again.

If the response to the query posed in software program step <430> is negative, then depending on the embodiment, a determination will be made as to whether or not the ground speed of the machine 102 is less than the rotational velocity of the drivetrain for the machine 102 and is the ground speed of the machine 102 increasing with respect to the rotational velocity of the drivetrain for the machine 102 <460>. For the second and preferred embodiment of the present invention, the same step occurs only with acceleration rather than velocity so that a determination will be made as to whether or not the ground acceleration of the machine 102 is less than the rotational acceleration of the drivetrain for the machine 102 and is the ground acceleration of the machine 102 increasing with respect to the rotational acceleration of the drivetrain for the machine 102 <460>. If the response to the query posed in software program step <460> is positive, then a determination is made as to whether or not the upper inflation pressure limit for the pneumatic wheels 106 has been reached <470>. If this upper inflation pressure limit has not been reached, then the control system 204 through the inflation pressure system 314 will increase the inflation pressure applied to the pneumatic wheels 106 as measured by the pneumatic wheel inflation pressure sensors 318, as shown in FIG. 3 <480>. This increase is preferably proportional to either the velocity difference or the acceleration difference depending on the embodiment, however, the increase may be incremental. After increasing the inflation pressure in the pneumatic wheels 106, the software program will return to program step <410>. If this upper inflation pressure limit has been reached in program step <470>, then the control system 204 through the inflation pressure system 314 will not increase the inflation pressure applied to the pneumatic wheels 106 and the software program will return to program step <410>. If the response to the query posed in software program step <460> is negative, then the software program will return to program step <410>.

Referring now to FIG. 5, the inflation pressure applied to at least one pneumatic wheel 106 may be altered by determining the temperature of at least one pneumatic wheel 106 <510> and then either increasing or decreasing the inflation pressure applied to at least one pneumatic wheel 106 based on the sensed temperature within predetermined upper and lower inflation pressure limits <520>. As shown in FIG. 3, the pneumatic wheel temperature sensor 310 will provide readings to the control system 204 and then the control system 204 will alter the amount of inflation pressure applied to at least one pneumatic wheel 106 through the inflation pressure system 314. As previously described, the actual pressure in the pneumatic wheel 106 is measured by the pneumatic wheel inflation pressure sensors 318 and then provided to the control system 204. The actual inflation pressure is contrasted by the control system 204 with the desired inflation pressure and the inflation pressure system 314 is compensated accordingly. This system may be utilized alone or in conjunction with the velocity or acceleration differential measurement system illustrated in FIG. 4 and as previously described.

Referring now to FIG. 6, the inflation pressure applied to at least one pneumatic wheel 106 may be altered by determining the weight load on at least one pneumatic wheel 106 <610> and then either increasing or decreasing the inflation pressure applied to at least one pneumatic wheel 106 based on the weight load within predetermined upper and lower inflation pressure limits <620>. As shown in FIG. 3, the pneumatic wheel weight load sensor 312 will provide readings to the control system 204 and will alter the amount of inflation pressure applied to at least one pneumatic wheel 106 through the inflation pressure system 314. As previously described, the actual pressure in the pneumatic wheel 106 is measured by the pneumatic wheel inflation pressure sensors 318 and then provided to the control system 204. The actual inflation pressure is contrasted by the control system 204 with the desired inflation pressure and then the inflation pressure system 314 is compensated accordingly. This system may be utilized either alone or in conjunction with the velocity or acceleration differential measurement system illustrated in FIG. 4 as well as the temperature measurement system illustrated in FIG. 5, which were both previously described above.

An alternative embodiment is disclosed in FIG. 7. In this embodiment, a terrain map database 320, as shown in FIG. 3, of an area to be traversed by the machine 102 is stored in the control system 204. The area to be traversed is divided into grids of a desired resolution <710>. A machine position sensor 322, as shown in FIG. 3, is located on the machine 102, and determines the location of the machine 102 with respect to the terrain map database 320 as the machine 102 traverses the area <720>. Preferably, the machine position sensor 322 is a global positioning system (GPS). However, other machine position determining systems, e.g., laser, dead reckoning, and the like, could be used as well.

Information from the terrain map database 320 and the machine position sensor 322 is delivered to the control system 204. The control system 204 uses this information in conjunction with either ground speed versus rotational velocity differential data or ground acceleration versus rotational acceleration differential data depending on the embodiment utilized as previously described and illustrated in FIG. 4. The control system 204 then responsively updates the grid information in the terrain map database 320 and correlates this information with either ground speed versus rotational velocity differential data or ground acceleration versus rotational acceleration differential data <730>. In addition, information from the terrain map database 320 and the machine position sensor 322 that is delivered to the control system 204 can also be utilized in conjunction with temperature data and weight load data, as illustrated in FIGS. 5 and 6, respectively, and as previously described. Velocity differential data, acceleration differential data, temperature data or weight load data can be correlated either alone or in any combination with positional data.

The control system 204 will then determine a desired inflation pressure as a function of velocity differential data, acceleration differential data, temperature differential data or weight load differential data individually or in any possible combination thereof <740>. Preferably, the desired inflation pressure will vary in proportion to these listed factors. For example, it is generally advantageous for the desired inflation pressure to be at a low value when traversing soft ground 104, as shown in FIG. 1, that creates a high degree of either velocity or acceleration differential. Low inflation pressures allow the pneumatic wheels 106 to traverse the soft ground 104 more efficiently.

However, when the ground 104 is firmer and denser, it is advantageous to increase the desired inflation pressure of the pneumatic wheels 106 to provide greater mobility to the machine 102. The increased inflation pressure results in increased contact pressure being applied by the pneumatic wheels 106 of the machine 102 with decreased contact area.

As shown in FIG. 3, when the control system 204 determines a new value of desired inflation pressure, a command is delivered to an inflation pressure system 314, which in turn inflates the pneumatic wheels 106. The inflation pressure is measured by the pneumatic wheel inflation pressure sensors 318 and then the control system compensates the inflation pressure system so that the actual inflation pressures corresponds to the desired inflation pressure.

Industrial Applicability

The present invention is advantageously applicable in controlling the inflation pressure of pneumatic wheels of any type of machine having pneumatic wheels. The following description is only for the purposes of illustration and is not intended to limit the present invention as such. It will be recognizable, by those skilled in the art, that the present invention is suitable for a plurality of other applications.

The present invention determines a differential of ground speed of a machine 102 versus rotational velocity of the drivetrain for a machine 102 or a differential of ground acceleration of a machine 102 versus rotational acceleration of a drivetrain for the machine 102. The temperature and weight load applied to at least one pneumatic wheel 106 of a machine 102 can also be utilized to alter the inflation pressure applied to that pneumatic wheel 106.

In addition, an alternative embodiment includes determining the location of a machine with respect to a terrain map database and dividing an area to be traversed into grids of a desired resolution. There is then a determination of the location of the machine 102 with respect to the terrain map database as the machine 102 traverses the area of ground 104. The previously obtained values of ground speed of a machine 102 versus rotational velocity of a drivetrain of a machine 102 or ground acceleration of the machine 102 versus rotational acceleration of the drivetrain for a machine 102 are then correlated to the physical position of the machine either with or without pneumatic wheel temperature data or pneumatic wheel weight load data. An inflation pressure system 318 will either increase or decrease the inflation pressure applied to at least one pneumatic wheel 106 within predetermined upper and lower inflation pressure limits based on the previously obtained values of ground speed of a machine 102 versus rotational velocity of a drivetrain for a machine 102 or ground acceleration of the machine 102 versus rotational acceleration of the drivetrain for a machine 102.

In view of the foregoing, it is readily apparent that the subject method and apparatus for controlling inflation pressure of pneumatic wheels 106 that results in the most effective and highest quality engagement of the pneumatic wheels 106 with the ground 104.

Other aspects, objects and advantages of the present invention can be obtained from a study of the drawings, the disclosure and the appended claims.

What is claimed is:

1. A method for controlling inflation pressure of at least one pneumatic wheel on a machine having a drivetrain, including the steps of:

determining a ground speed of said machine;

determining a rotational velocity of said drivetrain;

maintaining said inflation pressure in response to a predetermined relationship between said ground speed of said machine and said rotational velocity of said drivetrain; and changing said inflation pressure in response to a continuous change in said predetermined relationship between said ground speed of said machine and said rotational velocity of said drivetrain.

2. A method, as set forth in claim 1, further including the step of establishing the predetermined relationship to indicate when said ground speed of said machine is less than said rotational velocity of said drivetrain.

3. A method, as set forth in claim 2, wherein said step of changing the inflation pressure in response to a continuous change in the predetermined relationship is further defined as decreasing said inflation pressure when said ground speed of said machine is decreasing with respect to said rotational velocity of said drivetrain.

4. A method, as set forth in claim 2, wherein said step of changing the inflation pressure in response to a continuous change in the predetermined relationship is further defined as increasing said inflation pressure when said ground speed of said machine is increasing with respect to said rotational velocity of said drivetrain.

5. A method, as set forth in claim 1, further comprising a step of measuring temperature of said at least one pneumatic wheel and wherein said step of adjusting said inflation pressure includes varying said inflation pressure at least partially in response to said temperature of said at least one pneumatic wheel.

6. A method, as set forth in claim 1, further comprising a step of measuring weight load on at least one pneumatic wheel and wherein said step of adjusting said inflation pressure includes varying said inflation pressure at least partially in response to said weight load on said at least one pneumatic wheel.

7. A method for controlling inflation pressure of at least one pneumatic wheel on a machine having a drivetrain, including the steps of:

determining a ground acceleration of said machine;

determining a rotational acceleration of said drivetrain;

maintaining said inflation pressure in response to a predetermined relationship between said ground acceleration of said machine and said rotational acceleration of said drivetrain; and changing said inflation pressure in response to a continuous change in said predetermined relationship between said ground acceleration of said machine and said rotational acceleration of said drivetrain.

8. A method, as set forth in claim 7, further including the step of establishing the predetermined relationship to indicate when said ground acceleration of said machine is less than said rotational acceleration of said drivetrain.

9. A method, as set forth in claim 8, wherein said step of changing the inflation pressure in response to a continuous change in the predetermined relationship is further defined as decreasing said inflation pressure when said ground acceleration of said machine is decreasing with respect to said rotational acceleration of said drivetrain.

10. A method, as set forth in claim 8, wherein said step of changing the inflation pressure in response to a continuous change in the predetermined relationship is further defined as increasing said inflation pressure when said ground acceleration of said machine is increasing with respect to said rotational acceleration of said drivetrain.

11. A method, as set forth in claim 7, further comprising a step of measuring temperature of said at least one pneumatic wheel and wherein said step of adjusting said inflation pressure includes varying said inflation pressure at least partially in response to said temperature of said at least one pneumatic wheel.

12. A method, as set forth in claim 7, further comprising a step of measuring weight load on at least one pneumatic wheel and wherein said step of adjusting said inflation pressure includes varying said inflation pressure at least partially in response to said weight load on said at least one pneumatic wheel.

13. An apparatus for controlling inflation pressure of at least one pneumatic wheel on a machine having a drivetrain, comprising:

a mechanism for determining a ground speed of said machine;

a mechanism for determining a rotational velocity of said drivetrain;

a control system for establishing a predetermined relationship between said ground speed of said machine and said rotational velocity of said drivetrain and for maintaining said inflation pressure in response to said predetermined relationship; and an inflation pressure system adapted to change said inflation pressure of said at least one pneumatic wheel in response to a continuous change in said predetermined relationship between said ground speed of said machine and said rotational velocity of said drivetrain.

14. An apparatus, as set forth in claim 13, wherein said control system establishes said predetermined relationship to indicate when said ground speed of said machine is less than said rotational velocity of said drivetrain.

15. An apparatus, as set forth in claim 14, wherein said control system decreases said inflation pressure when said ground speed of said machine is decreasing with respect to said rotational velocity of said drivetrain.

16. An apparatus, as set forth in claim 14, wherein said control system increases said inflation pressure when said ground speed of said machine is increasing with respect to said rotational velocity of said drivetrain.

17. An apparatus, as set forth in claim 13, further comprising a mechanism for measuring temperature of said at least one pneumatic wheel and wherein said control system adjusts said inflation pressure at least partially in response to said measured temperature of said at least one pneumatic wheel.

18. An apparatus, as set forth in claim 13, further comprising a mechanism for measuring weight load of said at least one pneumatic wheel and wherein said control system adjusts said inflation pressure at least partially in response to said measured weight load of said at least one pneumatic wheel.

19. An apparatus for controlling inflation pressure of at least one pneumatic wheel on a machine having a drivetrain, comprising:

a mechanism for determining a ground acceleration of said machine;

a mechanism for determining a rotational acceleration of said drivetrain;

a control system for establishing a predetermined relationship between said ground acceleration of said machine and said rotational acceleration of said drivetrain and for maintaining said inflation pressure in response to said predetermined relationship; and an inflation pressure system adapted to change said inflation pressure of said at least one pneumatic wheel in response to a continuous change in said predetermined relationship between said ground acceleration of said machine and said rotational acceleration of said drivetrain.

20. An apparatus, as set forth in claim 19, wherein said control system establishes said predetermined relationship to indicate when said ground acceleration of said machine is less than rotational acceleration of said drivetrain.

21. An apparatus, as set forth in claim 20, wherein said control system decreases said inflation pressure when said ground acceleration of said machine is decreasing with respect to said rotational acceleration of said drivetrain.

22. An apparatus, as set forth in claim 20, wherein said control system increases said inflation pressure when said ground acceleration of said machine is increasing with respect to said rotational acceleration of said drivetrain.

23. An apparatus, as set forth in claim 19, further comprising a mechanism for measuring temperature of said at least one pneumatic wheel and wherein said control system adjusts said inflation pressure at least partially in response to said measured temperature of said at least one pneumatic wheel.

24. An apparatus, as set forth in claim 19, further comprising a mechanism for measuring weight load of said at least one pneumatic wheel and wherein said control system adjusts said inflation pressure at least partially in response to said measured weight load of said at least one pneumatic wheel.

25. A method for controlling inflation pressure of at least one pneumatic wheel on a machine having a drivetrain, including the steps of:

determining a ground speed of said machine;

determining a rotational velocity of said drivetrain;

determining a physical position of said machine;

storing a difference between said ground speed of said machine and said rotational velocity of said drivetrain in correlation to said physical position of said machine;

maintaining said inflation pressure in response to a predetermined relationship of said difference between said ground speed of said machine and said rotational velocity of said drivetrain for said corresponding physical position of said machine; and changing said inflation pressure in response to a continuous change in said predetermined relationship of said difference between said ground speed of said machine and said rotational velocity of said drivetrain for said corresponding physical position of said machine.

26. A method for controlling inflation pressure of at least one pneumatic wheel on a machine having a drivetrain, including the steps of:

determining a ground acceleration of said machine;

determining a rotational acceleration of said drivetrain;

determining a physical position of said machine;

storing a difference between said ground acceleration of said machine and said rotational acceleration of said drivetrain in correlation to said physical position of said machine;

maintaining said inflation pressure in response to a predetermined relationship of said difference between said ground acceleration of said machine and said rotational acceleration of said drivetrain for said corresponding physical position of said machine; and changing said inflation pressure in response to a continuous change in said predetermined relationship of said difference between said ground acceleration of said machine and said rotational acceleration of said drivetrain for said corresponding physical position of said machine.

27. An apparatus for controlling inflation pressure of at least one pneumatic wheel on a machine having a drivetrain, comprising:

a mechanism for determining a ground speed of said machine;

a mechanism for determining a rotational velocity of said drivetrain;

a mechanism for determining a physical position of said machine;

a control system for storing a difference between said ground speed of said machine and said rotational velocity of said drivetrain in correlation to said physical position of said machine, for establishing a predetermined relationship of said difference between said ground speed of said machine and said rotational velocity of said drivetrain, and for maintaining said inflation pressure in response to said predetermined relationship of said difference between said ground speed of said machine and said rotational velocity of said drivetrain for said corresponding physical position of said machine; and an inflation pressure system adapted to change said inflation pressure of said at least one pneumatic wheel in response to a continuous change in said predetermined relationship of said difference between said ground speed of said machine and said rotational velocity of said drivetrain for said corresponding physical position of said machine.

28. An apparatus for controlling inflation pressure of at least one pneumatic wheel on a machine having a drivetrain, comprising:

a mechanism for determining a ground acceleration of said machine;

a mechanism for determining a rotational acceleration of said drivetrain;

a mechanism for determining a physical position of said machine;

a control system for storing a difference between said ground acceleration of said machine and said rotational acceleration of said drivetrain in correlation to said physical position of said machine, for establishing a predetermined relationship of said difference between said ground acceleration of said machine and said rotational acceleration of said drivetrain, and for maintaining said inflation pressure in response to said predetermined relationship of said difference between said ground acceleration of said machine and said rotational acceleration of said drivetrain for said corresponding physical position of said machine; and an inflation pressure system adapted to change said inflation pressure of said at least one pneumatic wheel in response to a continuous change in said predetermined relationship of said difference between said around acceleration of said machine and said rotational acceleration of said drivetrain for said corresponding physical position of said machine.

* * * * *